(12) United States Patent
Sung

(10) Patent No.: US 10,598,181 B2
(45) Date of Patent: Mar. 24, 2020

(54) GAS TURBINE ENGINES AND COMPRESSION SYSTEMS THEREFOR

(71) Applicant: Rayne Sung, Toronto (CA)

(72) Inventor: Rayne Sung, Toronto (CA)

(*) Notice: Subject to any disclaimer, the term of this patent is extended or adjusted under 35 U.S.C. 154(b) by 82 days.

(21) Appl. No.: 15/827,940

(22) Filed: Nov. 30, 2017

(65) Prior Publication Data

US 2019/0162188 A1 May 30, 2019

(51) Int. Cl.
| | | |
|---|---|---|
| F02C 3/05 | (2006.01) |
| F04D 3/02 | (2006.01) |
| F04D 23/00 | (2006.01) |
| F04D 19/02 | (2006.01) |
| F04D 29/44 | (2006.01) |
| F04D 17/02 | (2006.01) |
| F02C 3/08 | (2006.01) |

(52) U.S. Cl.
CPC .............. *F04D 3/02* (2013.01); *F02C 3/08* (2013.01); *F04D 17/02* (2013.01); *F04D 17/025* (2013.01); *F04D 19/02* (2013.01); *F04D 23/005* (2013.01); *F04D 29/442* (2013.01); *F05D 2250/232* (2013.01)

(58) Field of Classification Search
CPC ........... F04D 3/02; F04D 19/02; F04D 23/005
See application file for complete search history.

(56) References Cited

U.S. PATENT DOCUMENTS

| | | | |
|---|---|---|---|
| 4,603,549 A | 8/1986 | Albrecht | |
| 10,144,519 B2* | 12/2018 | Schwarz | .................. F02C 6/08 |
| 2004/0208740 A1* | 10/2004 | Hubbard | ............... F04D 17/165 |
| | | | 415/72 |
| 2009/0193786 A1 | 8/2009 | Murrow et al. | |

FOREIGN PATENT DOCUMENTS

| | | | | |
|---|---|---|---|---|
| GB | 357022 A | * | 9/1931 | ............... F01D 1/34 |
| GB | 1447990 A | | 9/1976 | |
| GB | 2355768 A | * | 5/2001 | ............... F01D 1/38 |
| GB | 2355768 A | | 5/2001 | |

OTHER PUBLICATIONS

International Search Report & Written Opinion, dated Jan. 15, 2019, in PCT Application No. PCT/CA2018/051384, filed Oct. 31, 2018.

* cited by examiner

*Primary Examiner* — Steven M Sutherland

(57) ABSTRACT

A gas turbine engine, with a conical screw integrated compression system, that utilizes at least one conical screw as an intermediary fluid transport device to facilitate the multi-staging of non-axial compressors, such as centrifugal and diagonal compressors, as well as or alternatively to combine non-axial compressors to axial compressors and to the fan. The conical screw in the compression system applies axial flow translation and funnels, as necessary, the exit flow of the impeller, fan or compressor into the next impeller or compressor.

14 Claims, 28 Drawing Sheets

GAS TURBINE ENGINES AND COMPRESSION SYSTEMS THEREFOR

FIELD OF INVENTION

The following relates generally to gas turbine engines, and more particularly to compression systems within gas turbine engines.

BACKGROUND OF INVENTION

During the late 1930s and early 1940's, Hans von Ohain of Germany and Frank Whittle of the United Kingdom introduced the first commercially viable gas turbine engines for aeronautical propulsion. Whittle and von Ohain worked independently in their respective countries without knowledge of the other's work. The resultant Whittle W.1 and the Heinkel HeS 3 were remarkably similar and both featured a centrifugal compressor.

The following sets out some terminology for gas turbine engines, and some classifications thereof. In particular, a gas turbine engine can, roughly-speaking, be described as having two sections: a cold section and a hot section. The hot section contains a combustor, turbine, and nozzle, whereas the cold section contains a propeller, which applies to turboprops, an inlet, and a compression system.

The compression system contains at least one compressor and, in turbofan engines, a fan. A particular compressor can be further designated as one of: low pressure, intermediate pressure, or high pressure, as determined by the spool to which the compressor is attached.

The designation for a spool depends on the turbine. For example, a spool attached to the high pressure turbine—the turbine closest to the combustor—is referred to as a high pressure spool. A spool attached to the low pressure turbine—the turbine furthest away from the combustor—is referred to as a low pressure spool. A spool attached to the intermediate pressure turbine—the turbine that is in between the high and low pressure turbines—is referred to as an intermediate pressure spool. Commercially speaking, a typical gas turbine engine incorporates two or three spools. If a gas turbine incorporates more than three spools, the same naming convention will still apply, meaning it will still depend on the turbine.

Logically, therefore, the compressor attached to a high pressure spool may be referred to as a high pressure compressor, the compressor attached to a low pressure spool may be referred to as a low pressure compressor, and the compressor attached to an intermediate pressure spool may be referred to as an intermediate pressure compressor.

A low pressure, intermediate pressure, or high pressure compressor may be further designated as having a particular design, depending on its respective components and number of stages. At present, there are three main types of compressors: those incorporating a radial impeller are known as centrifugal compressors, those incorporating a diagonal impeller are known as diagonal compressors, and those incorporating an axial rotor blade are known as axial compressors.

In the field of gas turbine engines, a compression system has many components. However, conventionally, a three-stage high pressure centrifugal compressor refers to a compressor having three radial impellers attached to a high pressure spool. As another example, a five-stage low pressure axial compressor refers to a compressor having five rows of axial compressor blades attached to a low pressure spool. As yet another example, a six-stage low pressure (5:1) axial-centrifugal compressor refers to a compressor having five rows of axial compressor blades and one radial impeller attached to a low pressure spool.

While the first aeronautical gas turbine engines used centrifugal compressors, they have been largely replaced by axial compressors. This is primarily because, while a single stage in a centrifugal compressor can compress airflow many times more compared to a single stage in an axial compressor, it is notoriously more difficult to produce an efficient multi-stage centrifugal compressor compared to a multi-stage axial compressor. In particular, efficient fluid transport from a centrifugal compressor or from another component that exits fluid centrifugally to a subsequent stage has heretofore been problematic as compared to fluid transport from components, such as axial compressors, that exit fluid axially.

SUMMARY OF INVENTION

In accordance with an aspect of the invention, there is provided a gas turbine engine comprising a compression system incorporating at least one conical screw for fluid transport between respective components of the compression system. The conical screw can be located between different components such as between impellers of different stages of a compressor, between different compressors in a compression system, between a fan and a compressor, and the like.

A conical screw between components in a gas turbine engine is useful for receiving and re-directing fluid that has exited one component with a first fluid flow profile so that it may be re-directed to have a second, different, fluid flow profile for downstream presentation to the subsequent component. For example, the incorporation of a conical screw into the compression system of a gas turbine engine as an intermediary fluid transport device can ameliorate the multi-staging fluid flow efficiency problem that has heretofore existed in gas turbine engines that incorporate centrifugal compressors and other non-axial compressors.

For example, a key issue with the multi-staging of centrifugal compressors concerns the direction of exit flow of the impellers. For the radial impeller, the exit flow is perpendicular to the axis of rotation and therefore has heretofore been incredibly problematic for multi-staging because the fluid flow profiles of radial impellers and a subsequent component (centrifugal versus axial) are not compatible for efficient operation. Furthermore, another key and compounding issue with the multi-staging of centrifugal compressors or their use in conjunction with turbofans concerns the radius of exit flow of the impellers. For the radial impeller, the exit radius of flow is typically larger than the inlet radius of flow suitable for the next component and therefore has heretofore been a compounding factor in the problems involved with multi-staging because the fluid flow profiles of a radial impeller and a subsequent component (large radius versus small radius) are not compatible for efficient operation; it is a challenge to forcefully duct the flow back toward the axis of rotation to enter a subsequent impeller.

A conical screw as an intermediary fluid transport device addresses such challenges with two concurrent steps. First, the conical screw draws in the radial impeller exit flow and introduces axial flow translation along the axis of rotation. Second, the conical nature of the conical screw effectively funnels the flows from the larger exit radius of the impellers into the smaller inlet radius of subsequent impellers. In addition to radial impellers, the two concurrent steps undertaken by a conical screw when employed as described herein can also apply to the multi-staging of other non-axial compressors.

A gas turbine engine may incorporate a conical screw within its compression system to provide intermediary fluid transport between different compressors and the fan. Using the same two-step process, a conical screw can take the exit flow of the fan or a compressor and transport the flow axially, and funnel the flow if necessary, to the subsequent component.

In an embodiment, the compression system comprises at least one compressor comprising at least two stages, wherein one of the at least one conical screw is intermediate two of the stages.

In an embodiment, the compression system comprises at least two compressors, wherein one of the at least one the conical screw is intermediate two of the compressors.

In an embodiment, the compression system incorporates a fan; and at least one compressor, wherein one of the at least one conical screw is intermediate the fan and a compressor.

In an embodiment, one or more of the at least one conical screw comprises a central hub; and at least one conveyor blade extending from the central hub.

In accordance with another aspect, there is provided a compression system for a gas turbine engine, the compression system incorporating at least one conical screw for fluid transport between respective components of the compression system.

In accordance with another aspect, there is provided a use of at least one conical screw for intermediary fluid transport in a compression system of a gas turbine engine.

BRIEF DESCRIPTION OF DRAWINGS

Embodiments of the invention will now be described with reference to the appended drawings in which.

DETAILED DESCRIPTION OF EMBODIMENTS

Disclosed herein is a gas turbine engine comprising a compression system incorporating at least one conical screw for fluid transport between respective components of the compression system. The conical screw can be located between different components such as between impellers of different stages of a compressor, between different compressors in a compression system, between a fan and a compressor, and the like. The conical screw is related to the Archimedes Screw, which is attributed to Archimedes of Syracuse in the mid to late 200s B.C.E. and has been since used in a variety of applications relating to fluid transport.

In the accompany drawings:
101 is a fan;
102 is the five stage low pressure axial compressor;
103 is the low pressure diagonal impeller;
104 is the low pressure spool;
105a, 105b, and 105c are the high pressure radial impellers;
106 is the high pressure spool;
107 is the combustor;
108 is the high pressure turbine;
109 is the low pressure turbine;
110 is the nozzle;
201a and 201b are the conical screws between two stages of a compressor;
202 is a conical screw between two compressors;
203 is a conical screw between the fan and the compressor;
301 is a conical hub;
302 is a cylindrical hub;
303 is a combination hub;
401 is a conveyor blade with no blade inducer attached and it travels the full conical hub length with one complete turn;
402 is a conveyor blade with no blade inducer attached and it travels the full cylindrical hub length with more than one complete turn;
403 is a conveyor blade with blade inducer attached and it travels the full conical hub length with less than one complete turn;

404 is a conveyor blade with blade inducer attached and it travels the full combination hub length with less than one complete turn;

405 is a conveyor blade with no blade inducer attached and it travels the partial cylindrical hub length with less than one complete turn;

501 is a blade inducer and it is attached to the conveyor blade at the conical hub end;

502 is a blade inducer and it is attached to the conveyor blade at combination hub end;

503 is a blade inducer that is detached from the conveyor blade and it is located at the combination hub end;

504 is a blade inducer that is detached from the conveyor blade and it is located at the cylindrical hub end;

505 is a blade inducer that is detached from the conveyor blade and it is not located at the cylindrical hub end;

601 is a baffle;

602 is a baffle hub.

Figure 1:
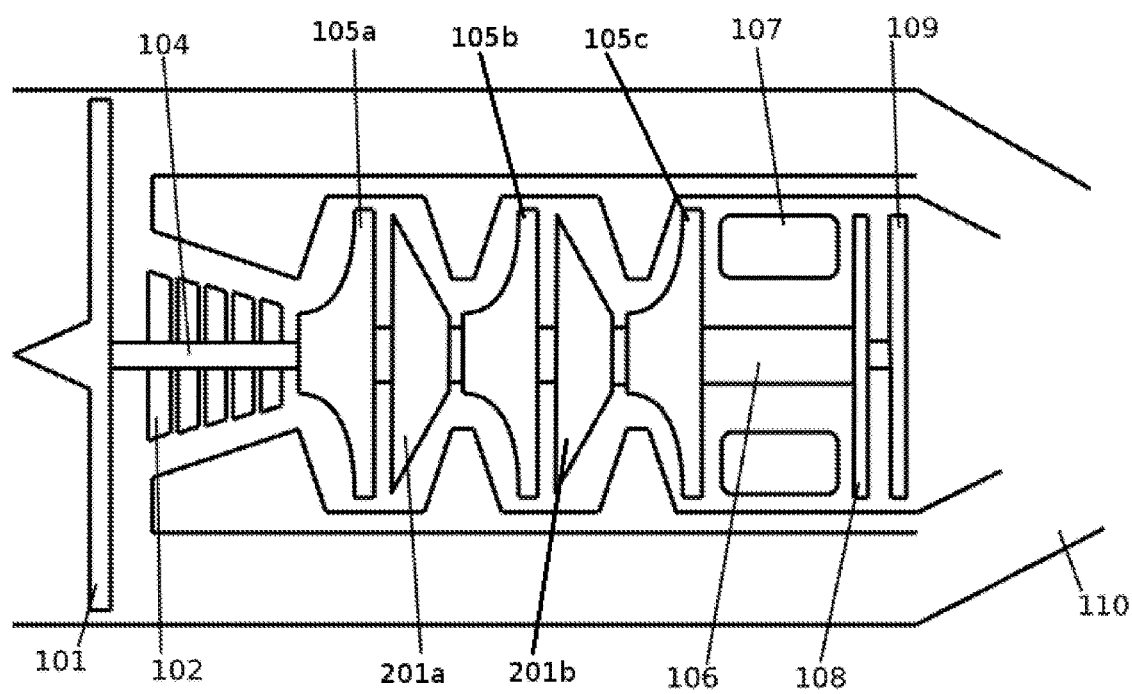
FIG. 1 is a cross-sectional schematic diagram of a turbofan engine incorporating conical screws within its compression system, where the conical screws are between stages in the high pressure compressor.
Figure 2:
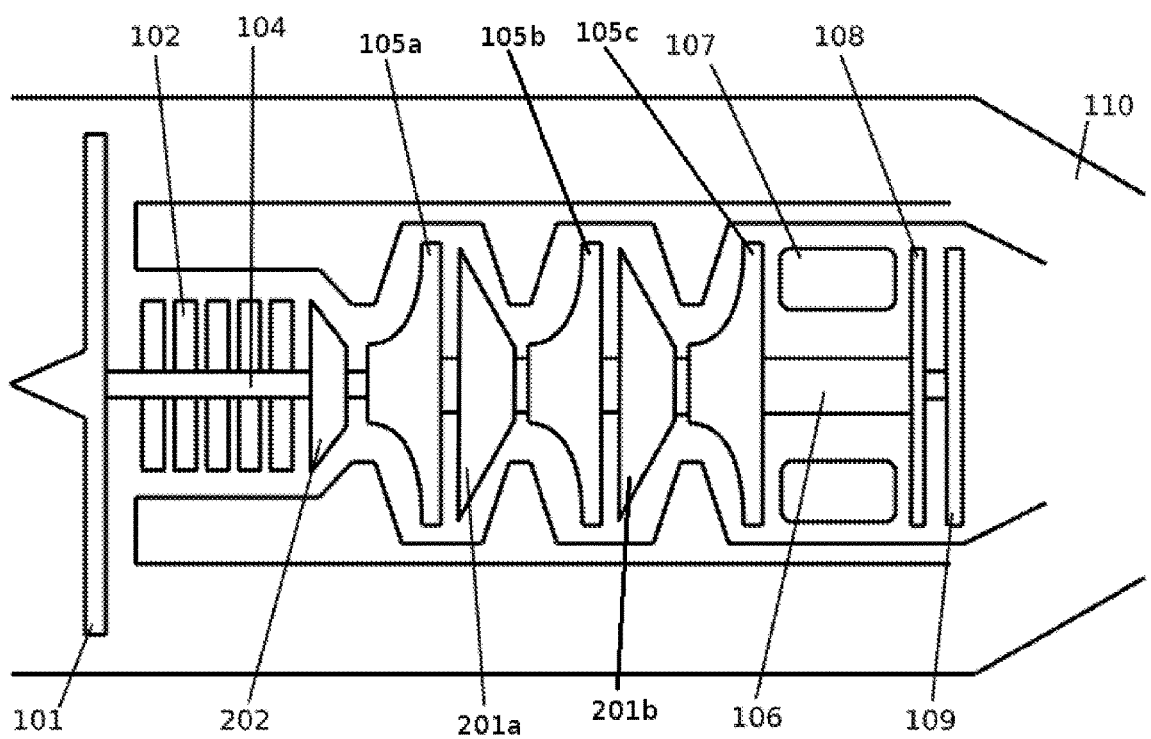
FIG. 2 is a cross-sectional schematic diagram of a turbofan engine incorporating conical screws within its compression system, where a conical screw is between stages of the high pressure compressor and a conical screw is between the low and high pressure compressors.
Figure 3:
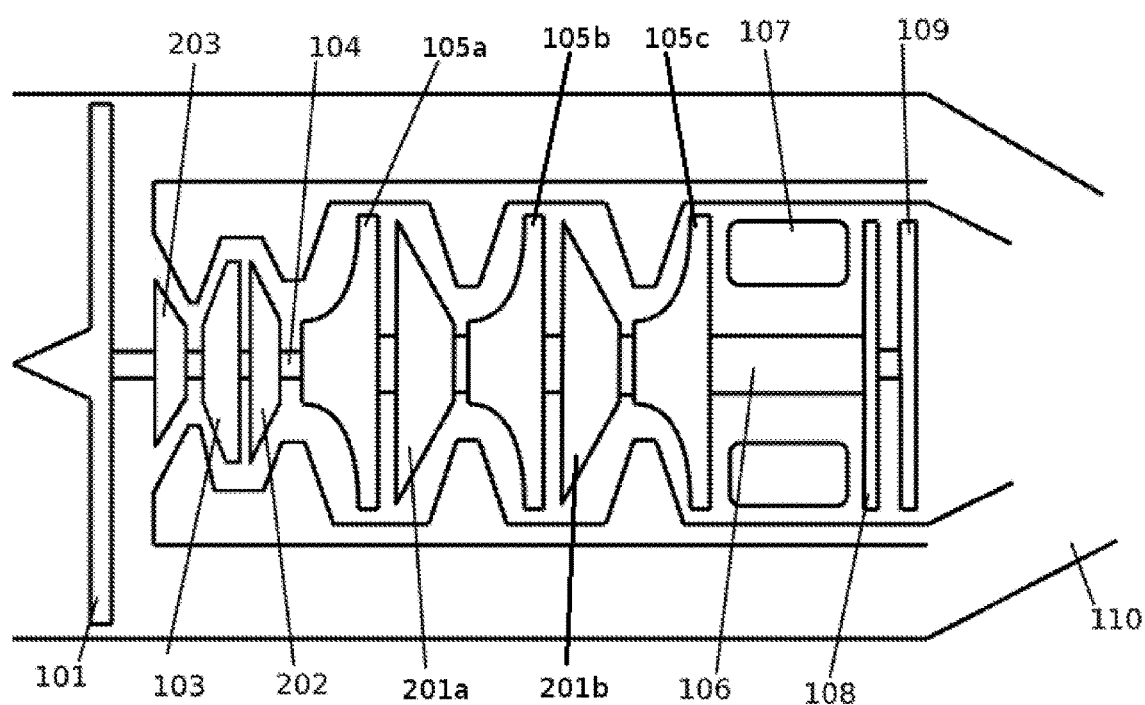
FIG. 3 is a cross-section schematic diagram of a turbofan engine incorporating conical screws within its compression system, where a conical screw is between stages in the high pressure compressor, another conical screw is between the fan and the low pressure compressor, and another conical screw is between the low pressure compressor and the high pressure compressor.

In the particularly advantageous embodiment of the invention illustrated, a gas turbine engine with a conical screw integrated compression system can have various designs. FIG. 1 to FIG. 3 show three turbofan engine embodiments incorporating conical screws while FIG. 4 to FIG. 28 shows several different designs of conical screws.

FIG. 1 is a cross-sectional schematic diagram of a turbofan engine incorporating conical screws 201 within its compression system, according to an embodiment. In this particular embodiment, the turbofan engine includes: a fan 101, a five stage low pressure axial compressor 102, a three stage high pressure centrifugal compressor with three radial impellers 105a, 105b, 105c, a combustor 107, a high pressure turbine 108, a low pressure turbine 109, a nozzle 110, a low pressure spool 104, and a high pressure spool 106. A first conical screw 201a is intermediate (between) the radial impellers 105a, 105b of stages one and two in the high pressure compressor, and a second conical screw 201b is intermediate the radial impellers 105b, 105c of stages two and three in the high pressure compressor. The conical screws 201 are either affixed directly to the high pressure spool 106 or they are affixed to other components that are in turn affixed to the high pressure spool 106.

The conical screws 201a, 201b between components are useful for receiving and re-directing fluid that has exited one component with a first fluid flow profile so that it may be re-directed to have a second, different, fluid flow profile for downstream presentation to a subsequent component in the gas turbine engine. In the embodiment of FIG. 1, for each of the conical screws 201a, 201b, the first fluid flow profile is a primarily centrifugal fluid flow and the second fluid flow profile is different and introduces more axial fluid flow. As such, in the embodiment of FIG. 1, the fluid centrifugally exiting the radial impeller 105a of stage one is redirected in a more axial direction by the coordinated rotation and drawing of the fluid by the blade (or blades) of conical screw 201a for downstream presentation to the radial impeller 105b of stage two. Similarly, the fluid centrifugally exiting the radial impeller 105b of stage two is redirected in a more axial direction by the coordinated rotation and drawing of the fluid by the blade (or blades) of conical screw 201b for downstream presentation to the radial impeller 105c of stage three.

While the conical screw is referred to as such, it will be understood that embodiments of screws described herein may be more accurately considered to have a frustoconical shape. However, for ease of understanding, conical and frustoconical screws that work as described herein to receive and re-direct fluid that has exited one component with a first fluid flow profile so that it may be re-directed to have a second, different, fluid flow profile for downstream presentation to a subsequent component will be referred to interchangeably herein simply as conical.

FIG. 2 is a cross-sectional schematic diagram of a turbofan engine incorporating conical screws within its compression system, according to another embodiment. The turbofan engine of FIG. 2 includes: a fan 101, a five stage low pressure axial compressor 102, a three stage high pressure centrifugal compressor with three radial impellers 105a, 105b, 105c, a combustor 107, a high pressure turbine 108, a low pressure turbine 109, a nozzle 110, a low pressure spool 104, and a high pressure spool 106. A first conical screw 201a is intermediate the radial impellers 105a, 105b of stages one and two in the high pressure compressor, and a second conical screw 201b is intermediate the radial impellers 105b, 105c of stages two and three in the high pressure compressor. In this embodiment, a third conical screw 202 is intermediate the low pressure axial compressor and the high pressure centrifugal compressor.

In the embodiment of FIG. 2, for each of the conical screws 201a, 201b, the first fluid profile is a primarily centrifugal fluid flow and the second fluid flow profile is different and introduces more axial fluid flow. As such, in the embodiment of FIG. 2, the fluid centrifugally exiting the radial impeller 105a of stage one is redirected in a more axial direction by the coordinated rotation and drawing of the fluid by the blade (or blades) of conical screw 201a for downstream presentation to the radial impeller 105b of stage two. Similarly, the fluid centrifugally exiting the radial impeller 105b of stage two is redirected in a more axial direction by the coordinated rotation and drawing of the fluid by the blade (or blades) of conical screw 201b for downstream presentation to the radial impeller 105c of stage three.

For conical screw 202, the first fluid flow profile is a primarily axial fluid flow of a first radius and the second fluid flow profile is also axial fluid flow of a second, smaller, radius. As such, in the embodiment of FIG. 2, the fluid axially exiting the low pressure axial compressor having a first radius is redirected in an axial direction towards having a smaller radius by the coordinated rotation and drawing of the fluid by the blade (or blades) of conical screw 202, for downstream presentation to the smaller-radius inlet of the high pressure centrifugal compressor.

FIG. 3 is a cross-section schematic diagram of a turbofan engine incorporating conical screws within its compression system, according to another embodiment. The turbofan engine of FIG. 3 includes: a fan 101, a single stage low pressure diagonal compressor containing a diagonal impeller 103, a three stage high pressure centrifugal compressor with three radial impellers 105a, 105b, 105c, a combustor 107, a high pressure turbine 108, a low pressure turbine 109, a nozzle 110, a low pressure spool 104, and a high pressure spool 106. A first conical screw 201a is intermediate the radial impellers 105a, 105b of stages one and two in the high pressure compressor, and a second conical screw 201b is intermediate the radial impellers 105b, 105c of stages two and three in the high pressure compressor. In this embodiment, a third conical screw 202 is intermediate the low pressure diagonal compressor and the high pressure centrifugal compressor. Furthermore, in this embodiment, a fourth conical screw 203 is intermediate the fan 101 and the low pressure diagonal compressor.

In the embodiment of FIG. 3, for each of the conical screws 201a, 201b, the first fluid profile is a primarily centrifugal fluid flow and the second fluid flow profile is different and introduces a more axial fluid flow. As such, in the embodiment of FIG. 3, the fluid centrifugally exiting the radial impeller 105a of stage one of the high pressure centrifugal compressor is redirected in a more axial direction by the coordinated rotation and drawing of the fluid by the blade (or blades) of conical screw 201a for downstream presentation to the radial impeller 105b of stage two. Similarly, the fluid centrifugally exiting the radial impeller 105b of stage two is redirected in a more axial direction by the coordinated rotation and drawing of the fluid by the blade (or blades) of conical screw 201b for downstream presentation to the radial impeller 105c of stage three.

For conical screw 202, the first fluid flow profile is that resulting from fluid exiting the diagonal impeller 103 and a subsequent diffuser (not shown in figures). It is therefore primarily axial fluid flow of a first radius. The second fluid flow profile is different and introduces an axial fluid flow of a second, smaller, radius. As such, in the embodiment of FIG. 3, the fluid exiting the low pressure diagonal compressor and a subsequent diffuser has a first radius and is redirected to have a smaller radius by the coordinated rotation and drawing of the fluid by the blade (or blades) of conical screw 202, for downstream presentation to the smaller-radius inlet of the first radial impeller 105a of the high pressure centrifugal compressor. In a sense, the conical screw 202 actively "funnels" the air flow introduced to it down to the smaller radius.

For conical screw 203, the first fluid flow profile is a primarily axial fluid flow of a first radius and the second fluid flow profile is a primarily axial fluid flow of a second, smaller, radius. As such, in the embodiment of FIG. 3, the fluid axially exiting the fan 101 having a first radius is redirected in an axial direction towards having a smaller radius by the coordinated rotation and drawing of the fluid by the blade (or blades) of conical screw 203, for downstream presentation to the smaller-radius inlet of the diagonal impeller 103 of the low pressure diagonal compressor.

While the embodiments shown in FIG. 1 through FIG. 3 are illustrative of certain ways in which a conical screw can provide intermediary fluid transport between the fan and a compressor, between two compressors, and between two stages within a compressor, variations from the embodiments specifically shown are possible. For example, embodiments are possible in which a compression system incorporates only one conical screw for providing intermediate fluid transport, whether the conical screw be intermediate the fan and a compressor, or between two compressors, or between two stages within a compressor.

Figure 4:
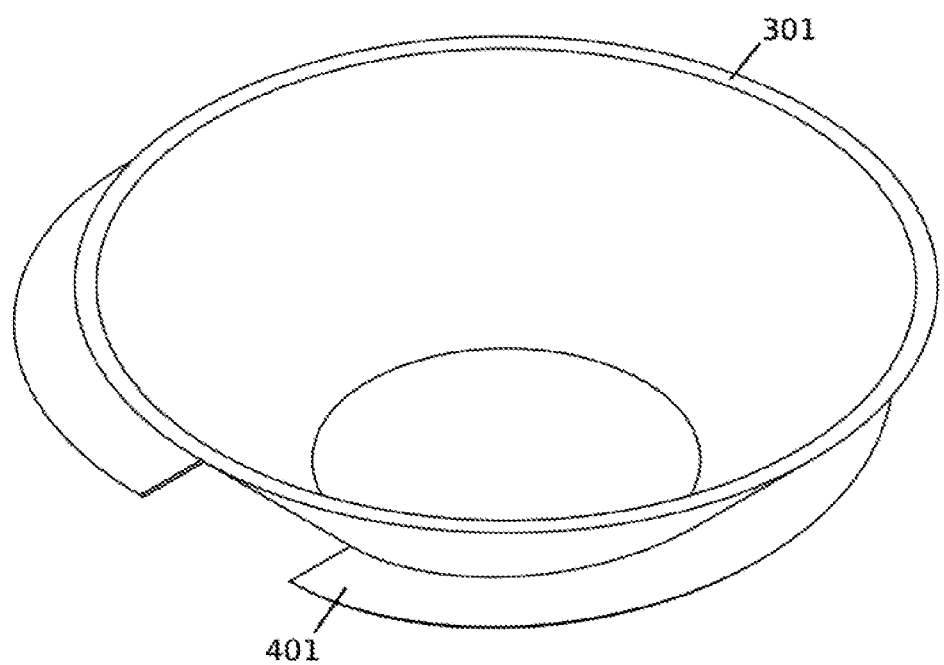
FIG. 4 is an isometric view of a conical screw according to an embodiment, with a conical hub and a single conveyor blade extending from the hub.
Figure 5:
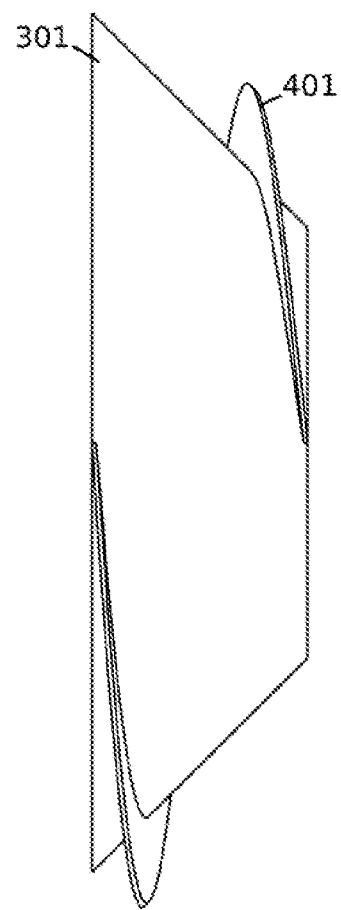
FIG. 5 is a front view of the conical screw of FIG. 4.
Figure 6:
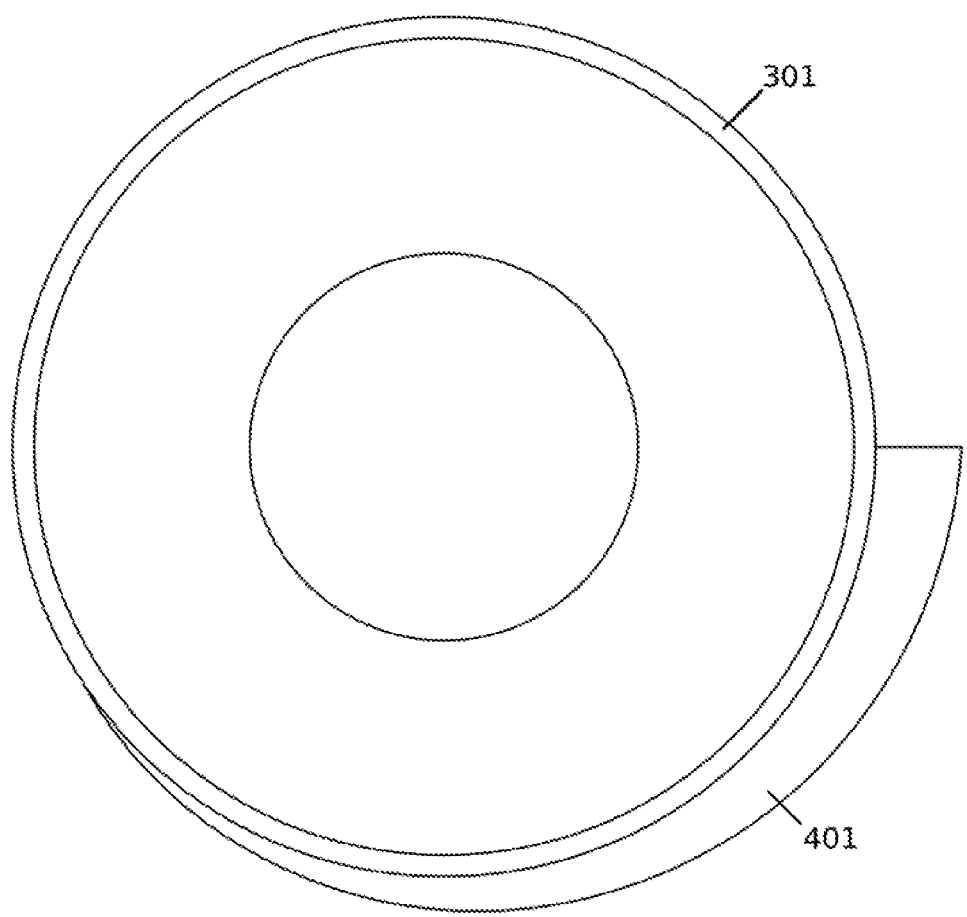
FIG. 6 is a left view of the conical screw of FIG. 4.
Figure 7:
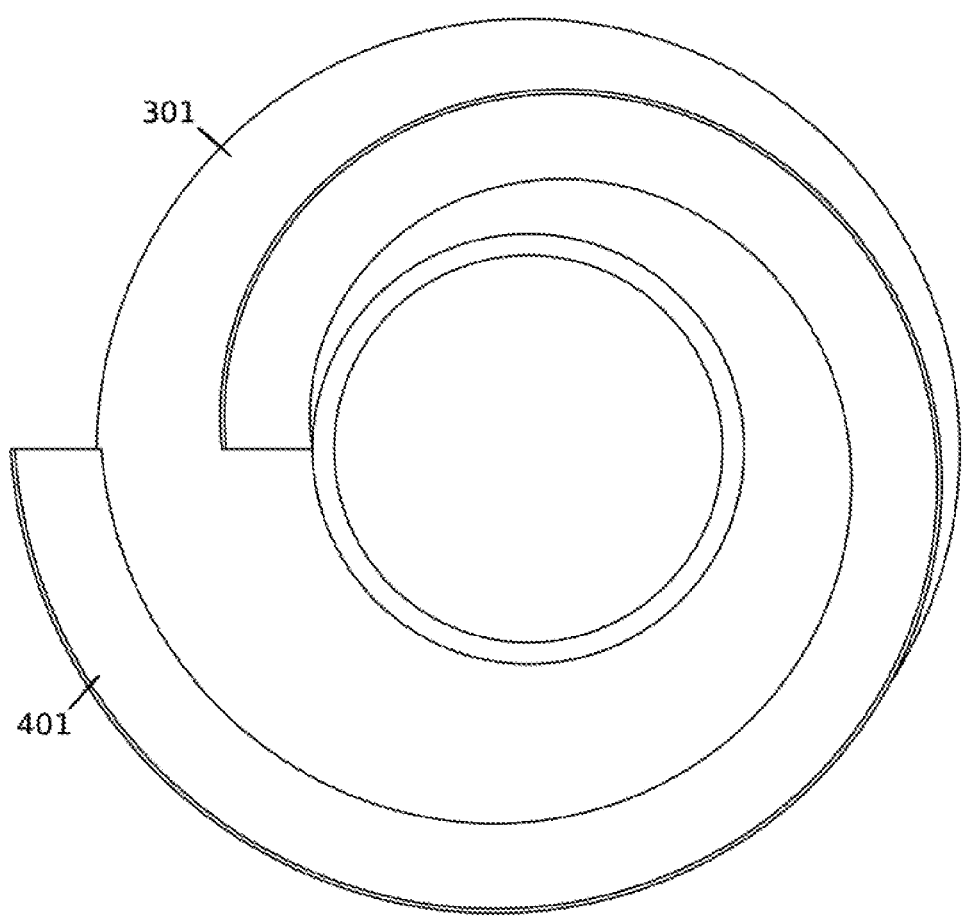
FIG. 7 is a right view of the conical screw of FIG. 4.
Figure 8:
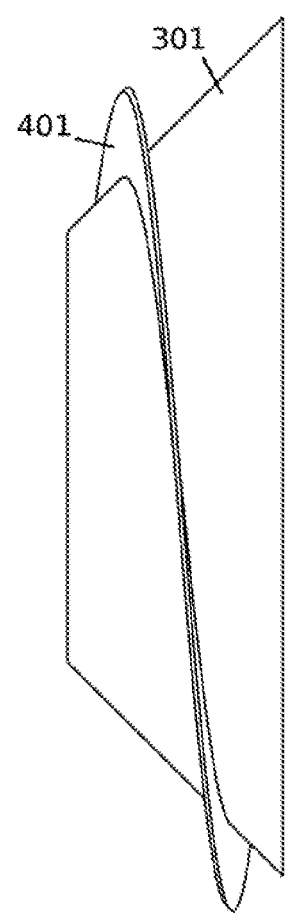
FIG. 8 is a back view of the conical screw of FIG. 4.

Various embodiments of conical screws for use in compression systems of gas turbine engines are possible. For example, FIG. 4 is an isometric view of a conical screw according to an embodiment, with a conical hub 301 and a single conveyor blade 401 extending from the hub 301. FIG. 5 through FIG. 8 are front, left, right and back views, respectively of the conical screw of FIG. 4. In this embodiment, the hub 301 being conical provides the conical shape of the conical screw and the conveyor blade 401 has a uniform width along the length of the hub 301 such that the outer edge of the conveyor blade 401 is the same distance from the hub 301 along its length.

In particular, conveyor blade 401 makes a full complete turn about the axis of rotation of the conical screw and travels the full length of the conical hub 301—the pitch and height respectively. The conveyor blade 401 maintains the conical shape with its outer edge and a fixed blade width and thickness resulting in two different radii of the conical screw at opposing ends of hub 301, thereby to provide the conical shape. They are referred to as the conical angle, blade width, blade thickness, and the inlet and exit radius respectively.

Figure 9:
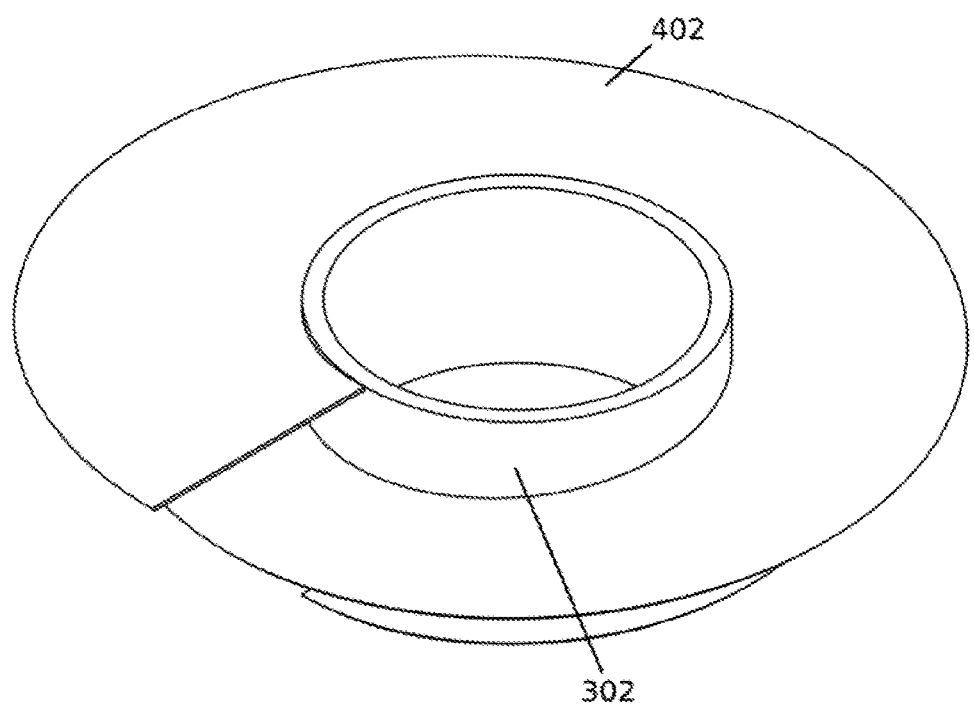
FIG. 9 is an isometric view of a conical screw according to another embodiment, with a cylindrical hub and a single conveyor blade extending from the hub.
Figure 10:
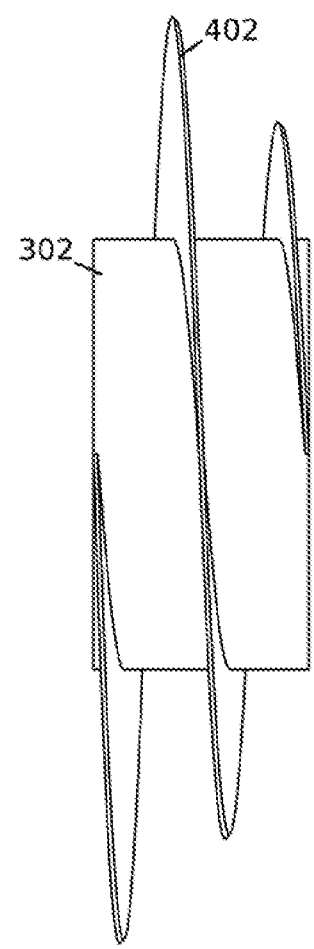
FIG. 10 is a front view of the conical screw of FIG. 9.
Figure 11:
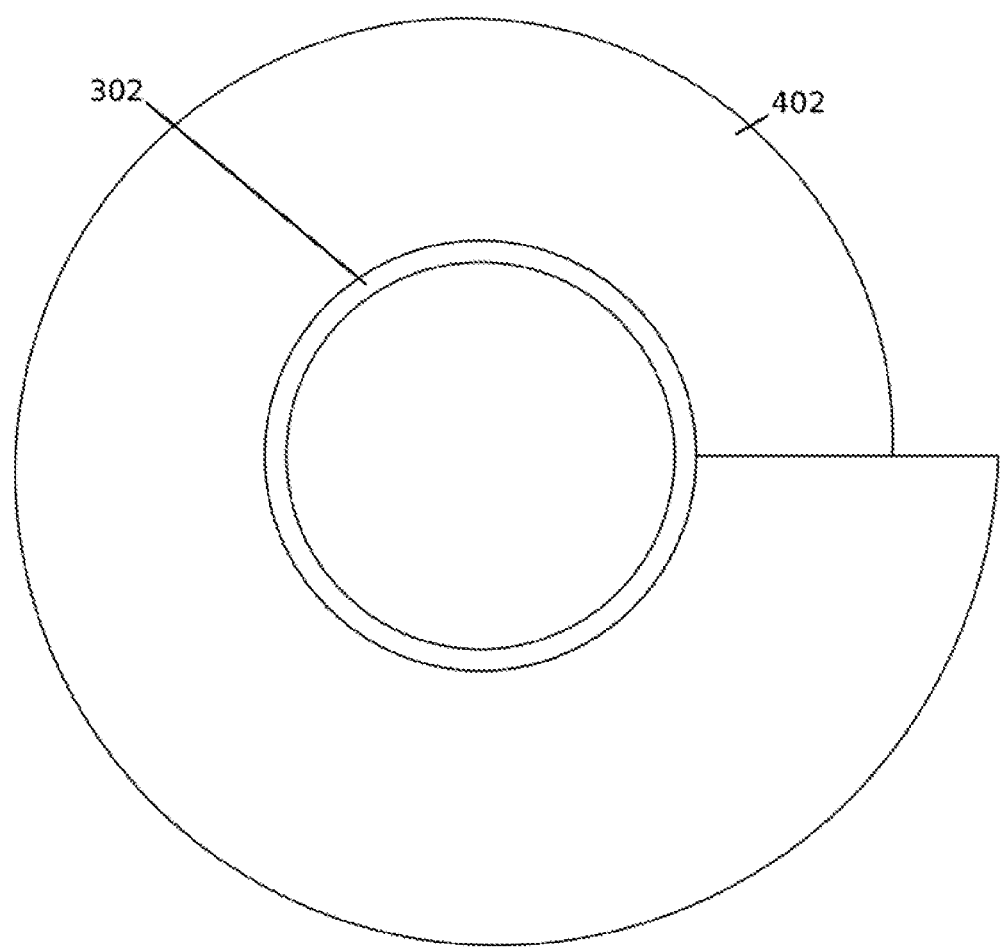
FIG. 11 is a left view of the conical screw of FIG. 9.
Figure 12:
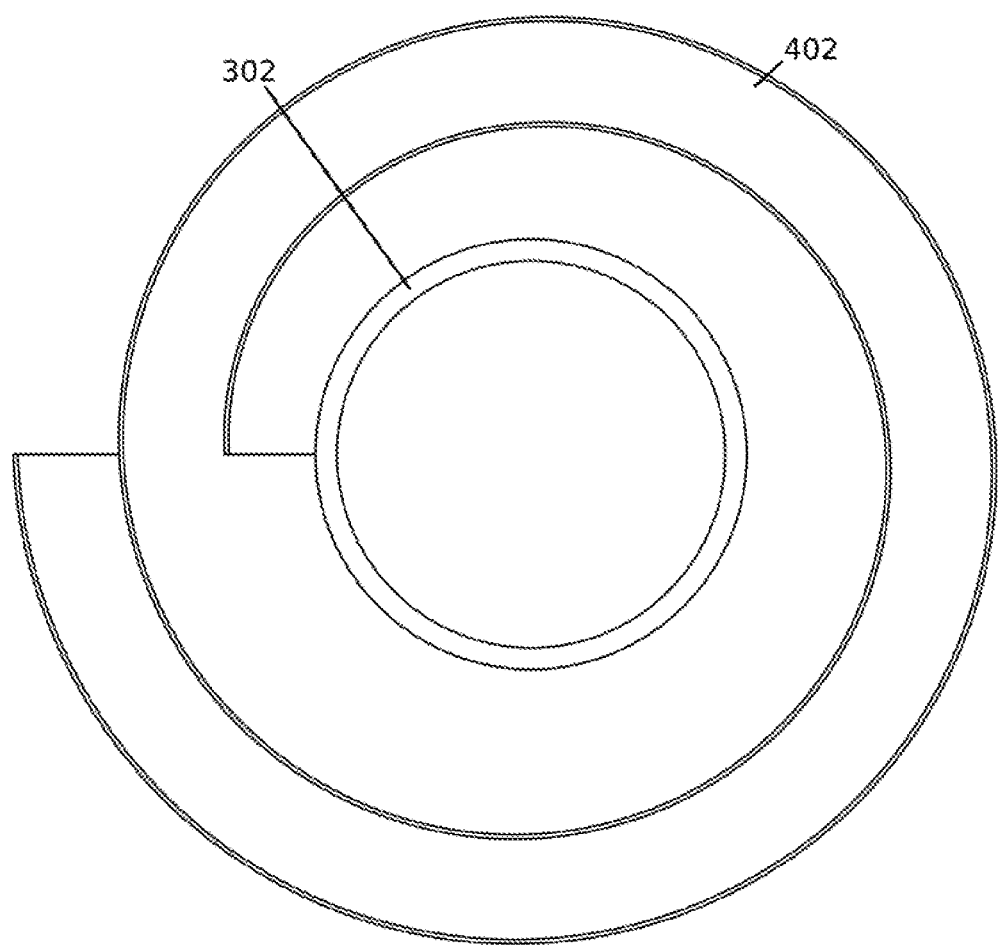
FIG. 12 is a right view of the conical screw of FIG. 9.
Figure 13:
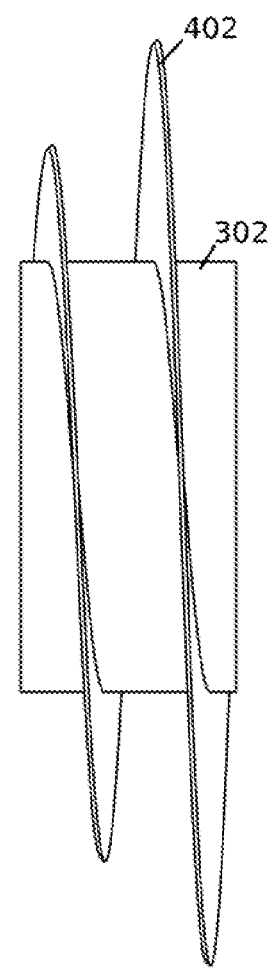
FIG. 13 is a back view of the conical screw of FIG. 9.

FIG. 9 is an isometric view of a conical screw according to another embodiment, with a cylindrical hub 302 and a single conveyor blade 402 extending from the hub 302. FIG. 10 through FIG. 13 are front, left, right and back views, respectively of the conical screw of FIG. 9. In this embodiment, the hub 302 being cylindrical has a generally uniform width along its length, and a progressively-diminishing width of conveyor blade 402 along the length of hub 302 provides the conical shape of the conical screw.

In particular, the conveyor blade 402 has a pitch and height that completes two full turns about the axis of rotation of hub 302 and travels the full length of hub 302. The outer edge of the conveyor blade 402 has a conical angle that maintains a conical geometry, which corresponds to a varying blade width, but with a fixed blade thickness.

Figure 14:
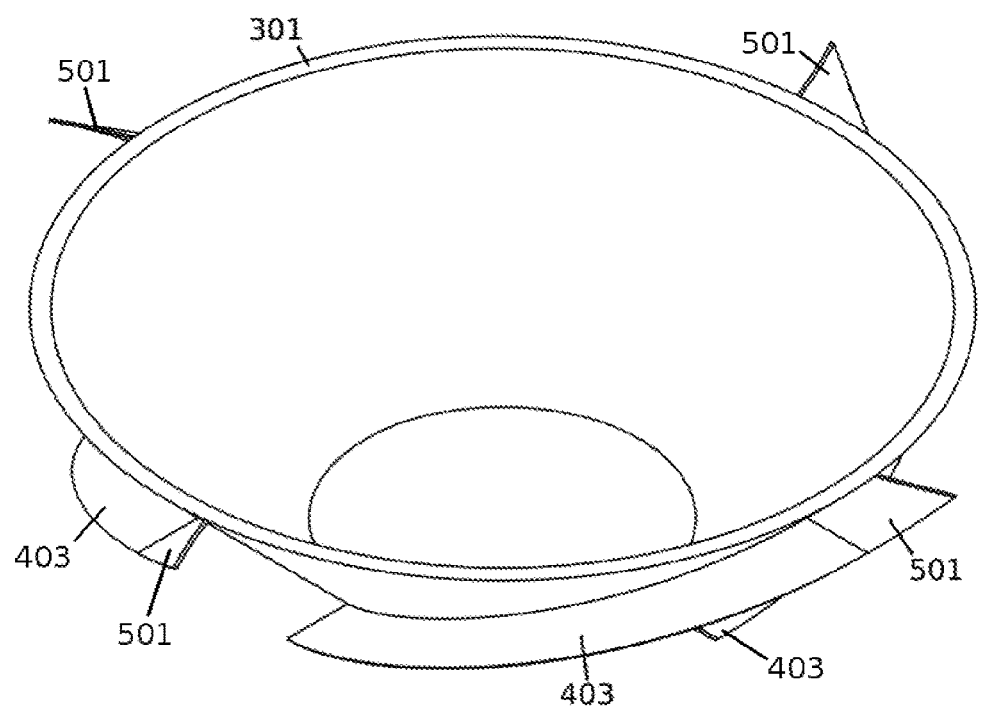
FIG. 14 is an isometric view of a conical screw according to another embodiment, with a conical hub and four conveyor blades extending from the hub, each with attached blade inducers.
Figure 15:
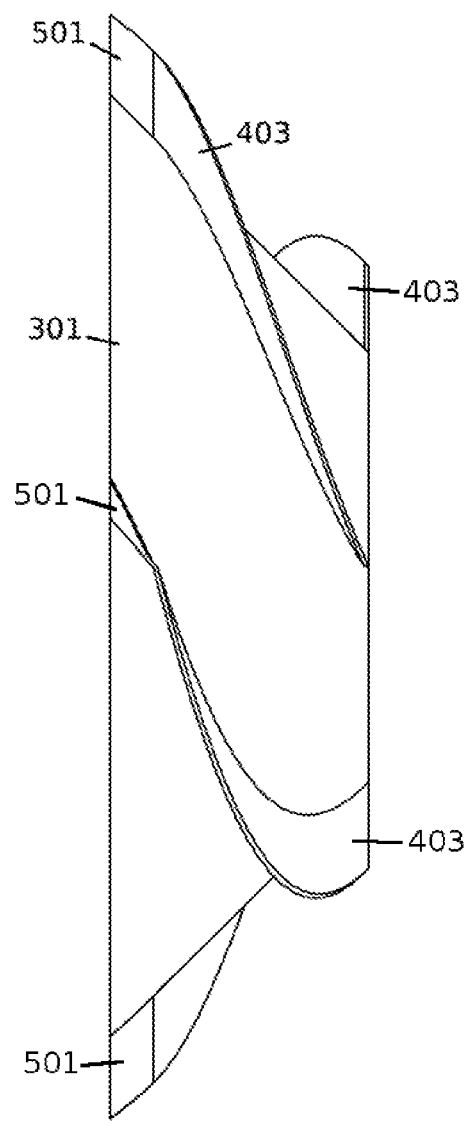
FIG. 15 is a front view of the conical screw of FIG. 14.
Figure 16:
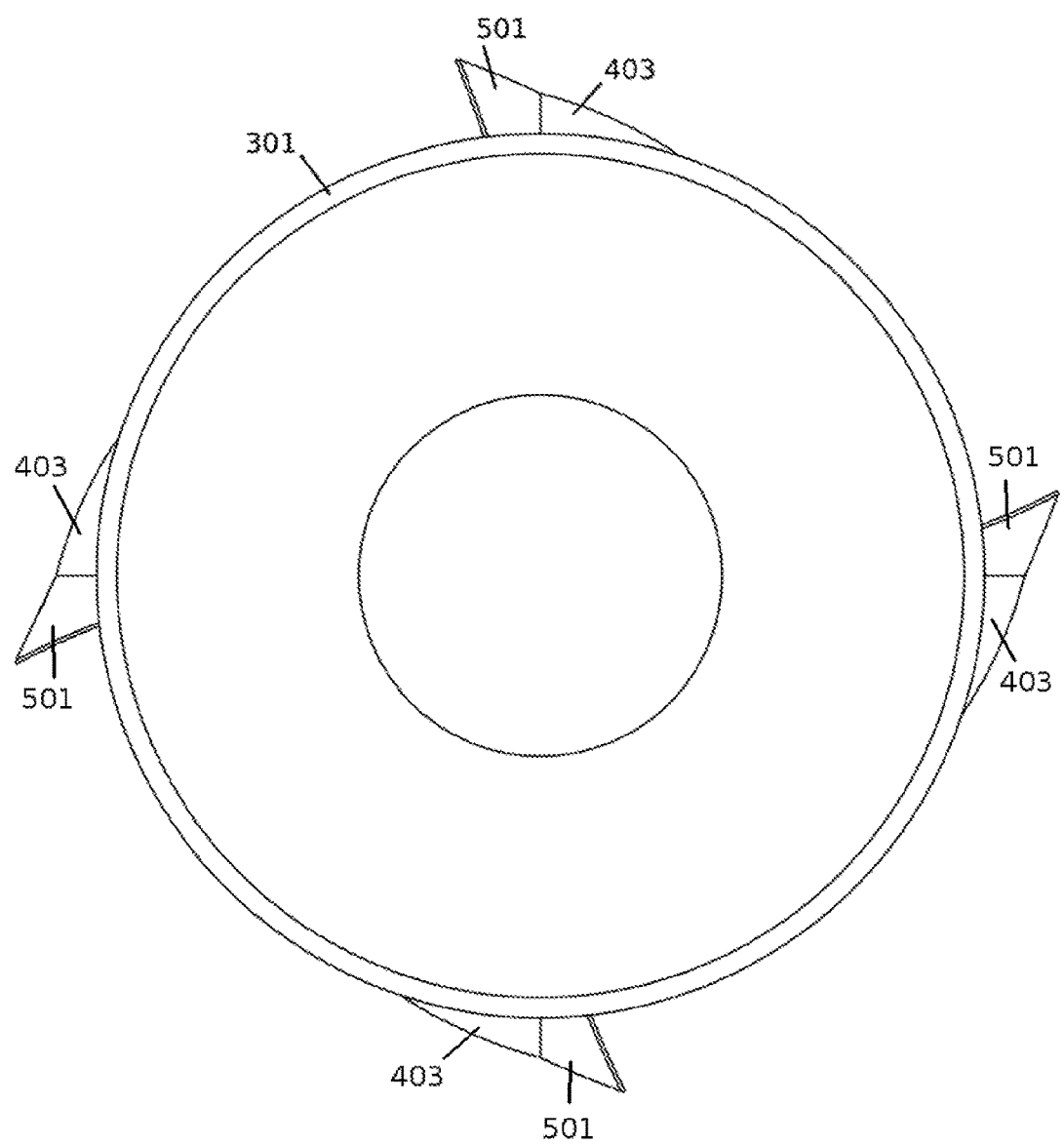
FIG. 16 is a left view of the conical screw of FIG. 14.
Figure 17:
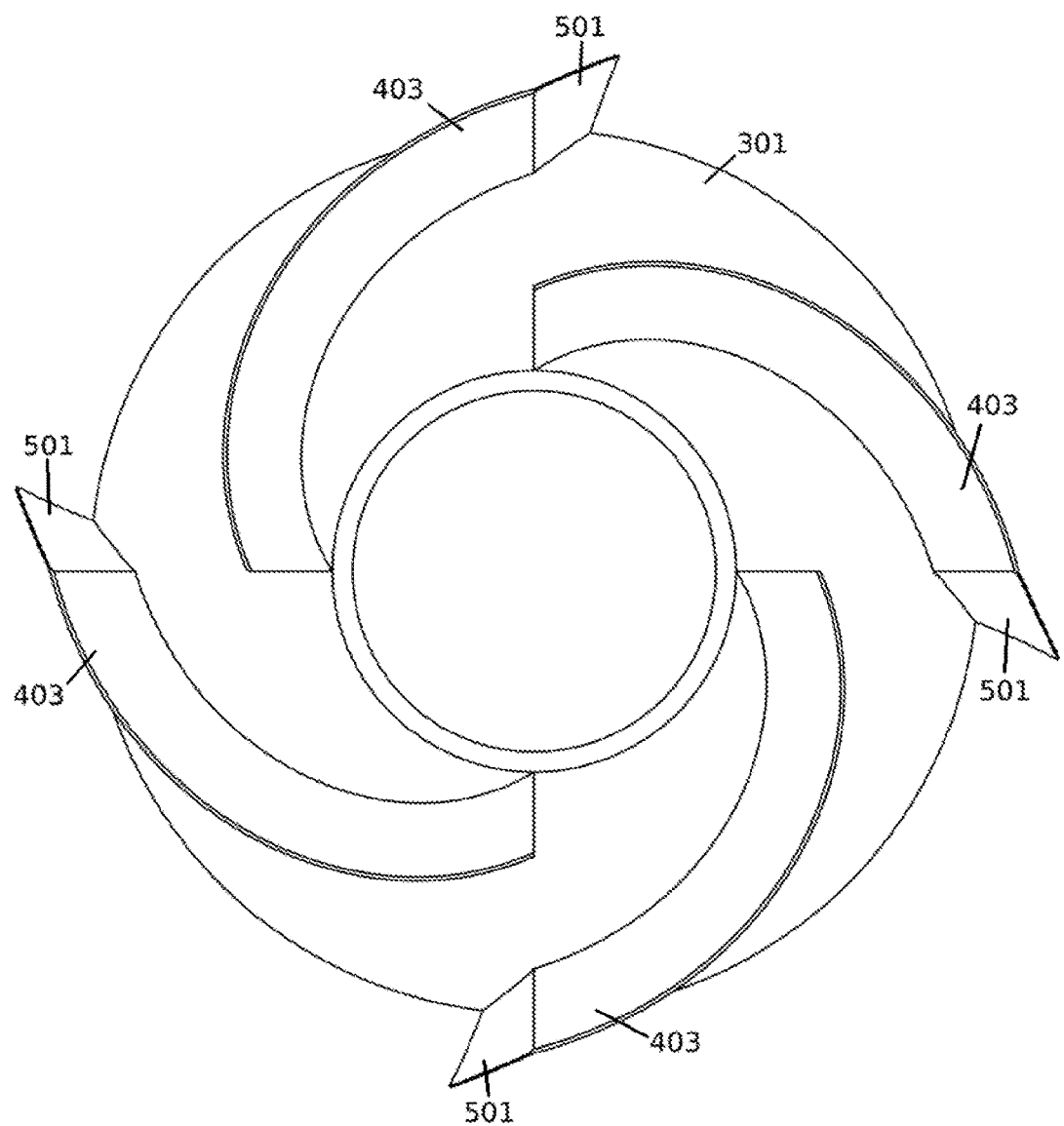
FIG. 17 is a right view of the conical screw of FIG. 14.
Figure 18:
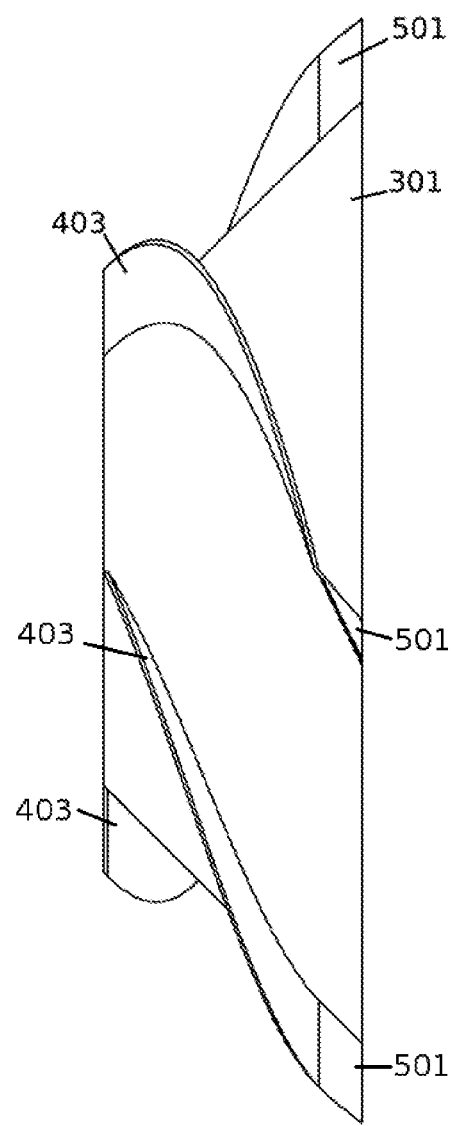
FIG. 18 is a back view of the conical screw of FIG. 14.

FIG. 14 is an isometric view of a conical screw according to another embodiment, with a conical hub 301 and four conveyor blades 403 extending from the hub 301, each with attached blade inducers 501. FIG. 15 through FIG. 18 are front, left, right and back views, respectively of the conical screw of FIG. 14. In this embodiment, the multiple attached blade inducers 501 and conveyor blades 403 increase the mass flow across the conical screw. Each of the conveyor blades 403 make a quarter turn pitch about the axis of rotation of the conical screw and have a uniform height that travels the full length of the conical hub 301.

Figure 19:
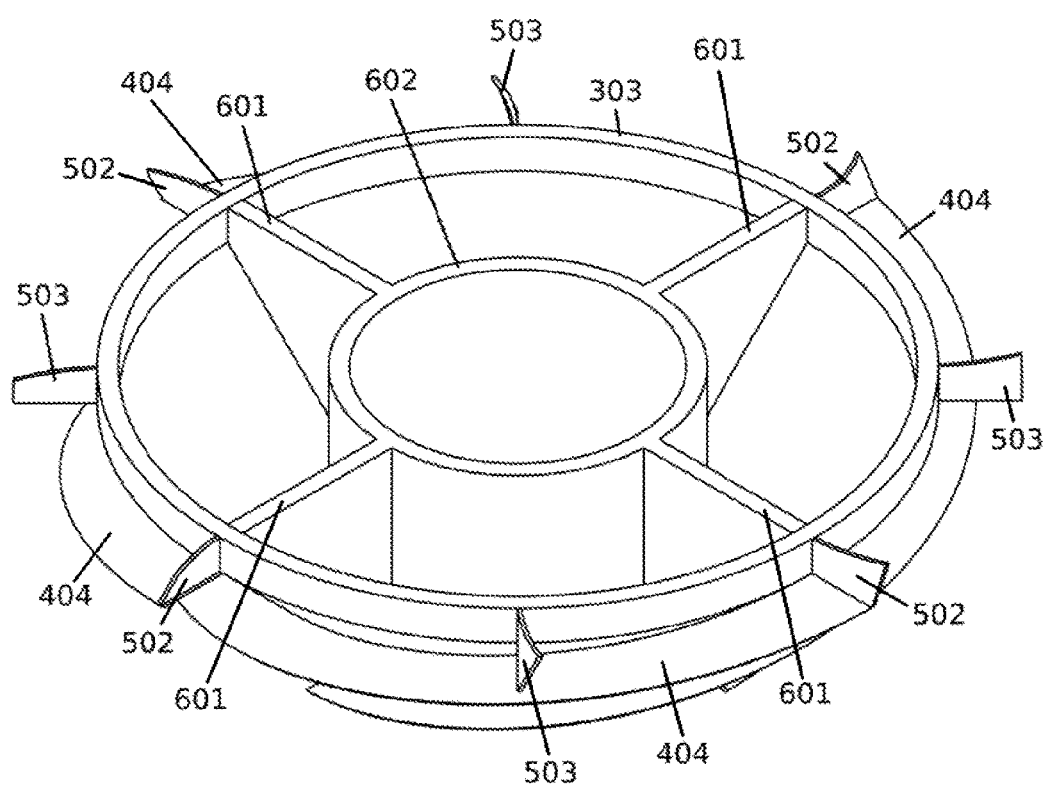
FIG. 19 is an isometric view of a conical screw according to another embodiment, with a combination hub, four conveyor blades with attached blade inducers, four detached blade inducers, four baffles, and a baffle hub.
Figure 20:
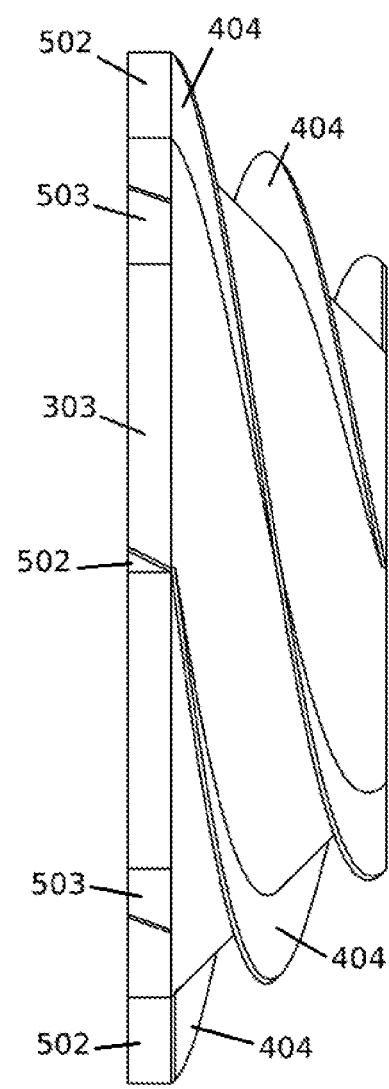
FIG. 20 is a front view of the conical screw of FIG. 19.
Figure 21:
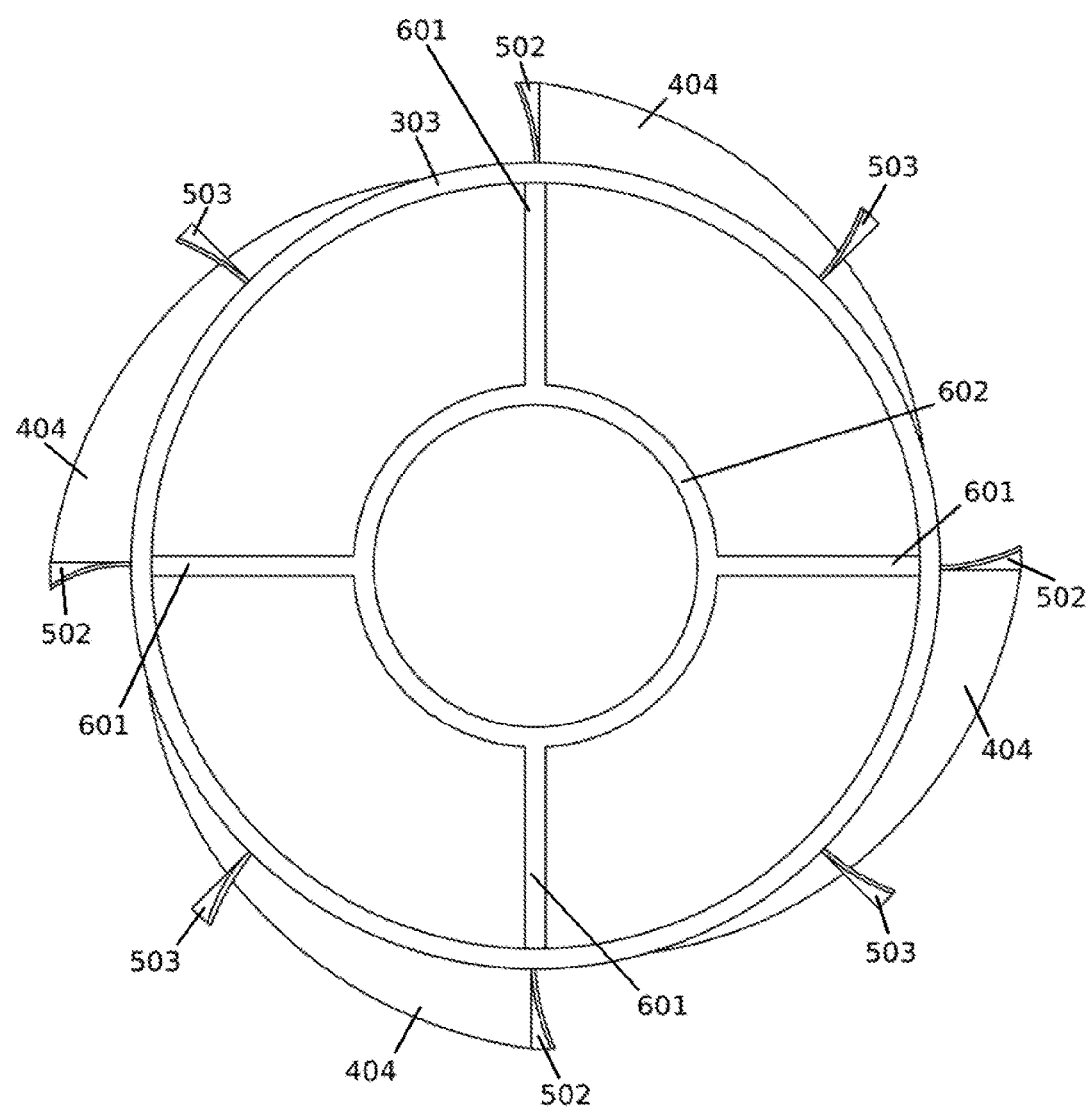
FIG. 21 is a left view of the conical screw of FIG. 19.
Figure 22:
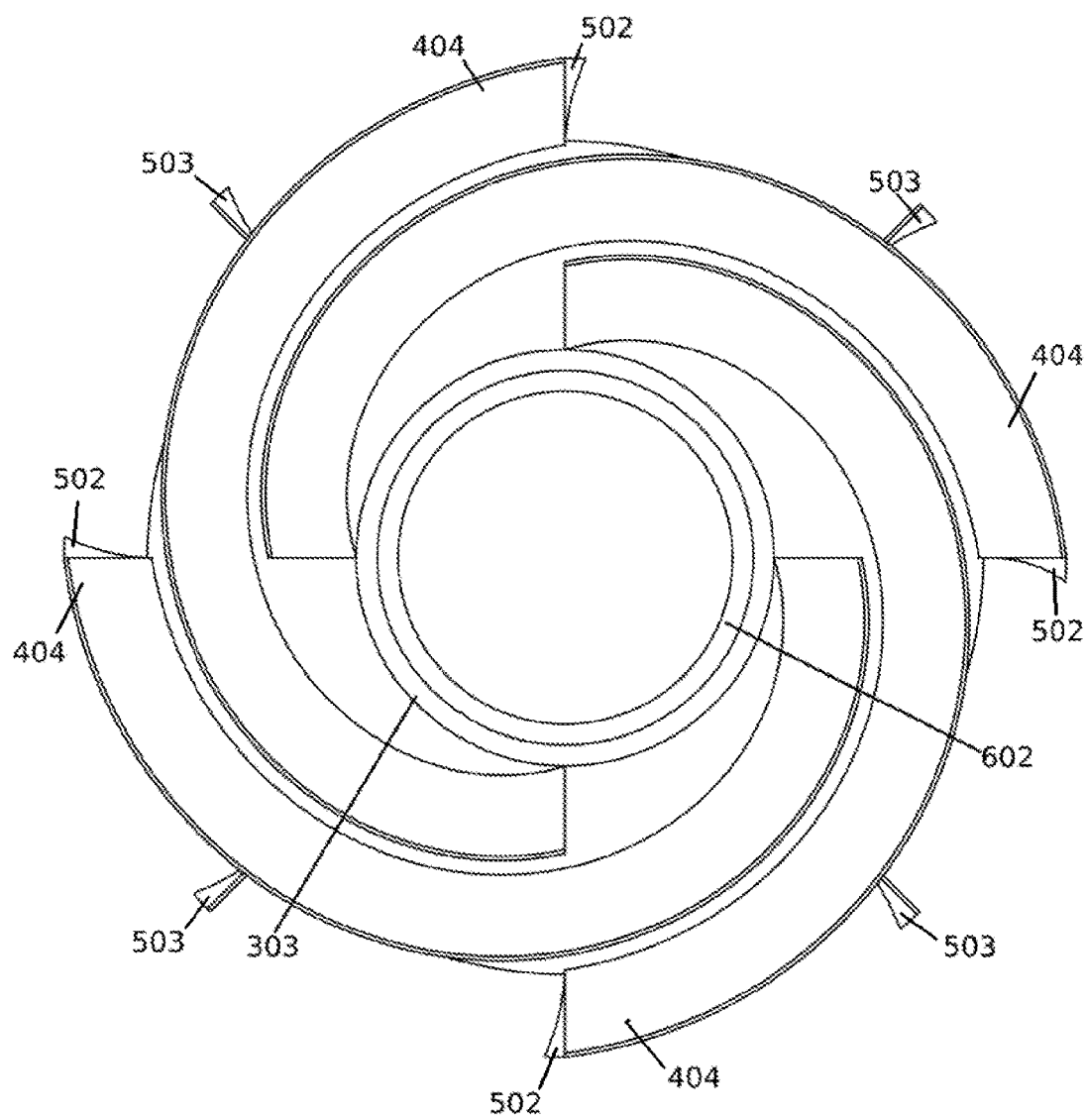
FIG. 22 is a right view of the conical screw of FIG. 19.
Figure 23:
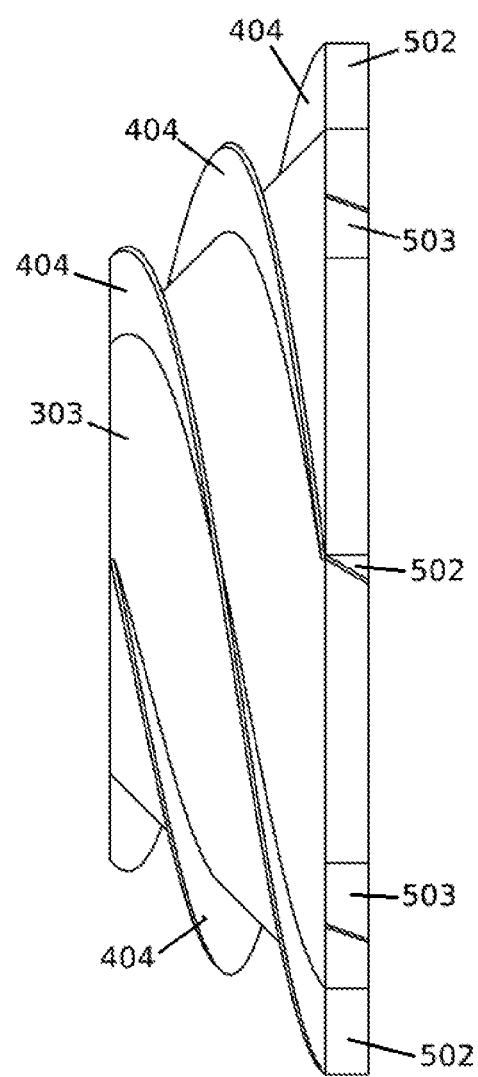
FIG. 23 is a back view of the conical screw of FIG. 19.

FIG. 19 is an isometric view of a conical screw according to another embodiment, with a combination hub 303, four conveyor blades 404 with attached blade inducers 502, four detached blade inducers 503, four baffles 601, and a baffle hub 602 for structural support. FIG. 20 through FIG. 23 are front, left, right and back views, respectively of the conical screw of FIG. 19. In this embodiment, the conveyor blades 404 each make a half turn pitch about the axis of rotation of the conical screw and have a uniform height that travels the full length of the combination hub 303.

Figure 24:
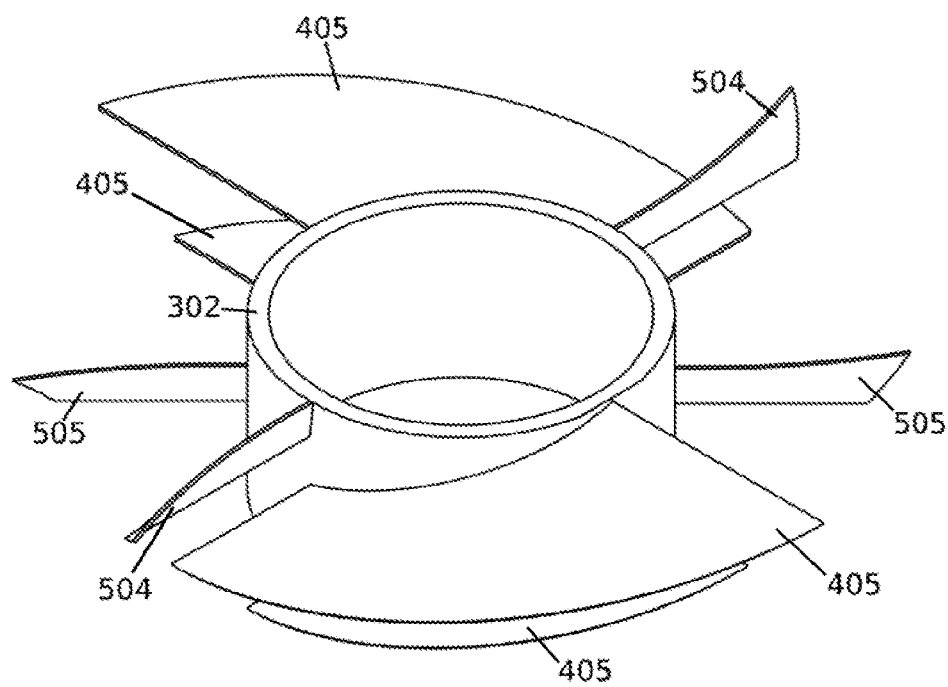
FIG. 24 is an isometric view of a conical screw according to an embodiment, having a cylindrical hub, four conveyor blades, and four detached blade inducers.
Figure 25:
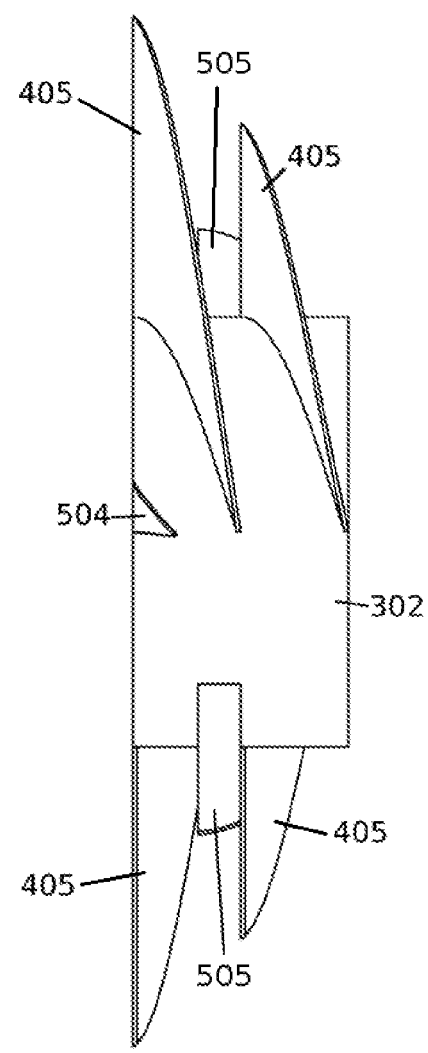
FIG. 25 is a front view of the conical screw of FIG. 24.
Figure 26:
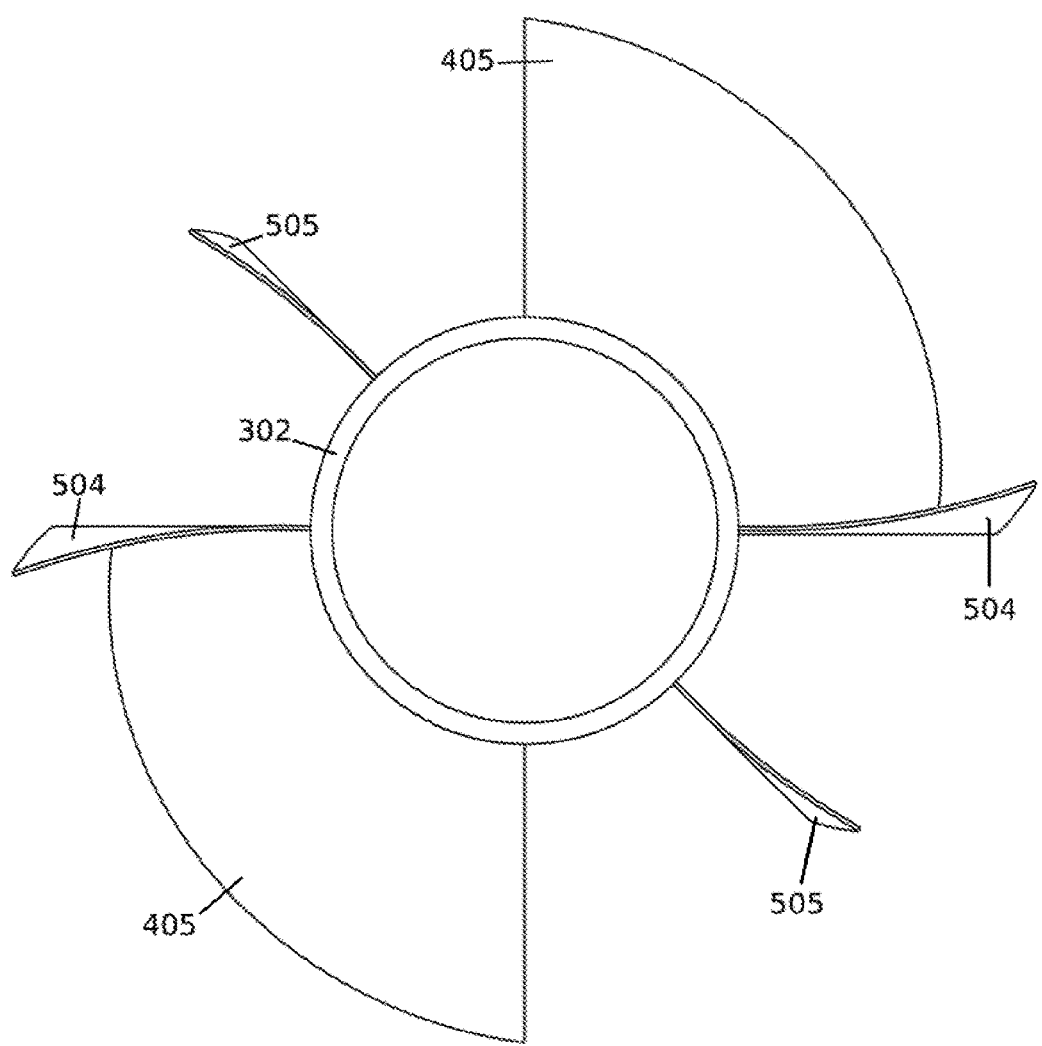
FIG. 26 is a left view of the conical screw of FIG. 24.
Figure 27:
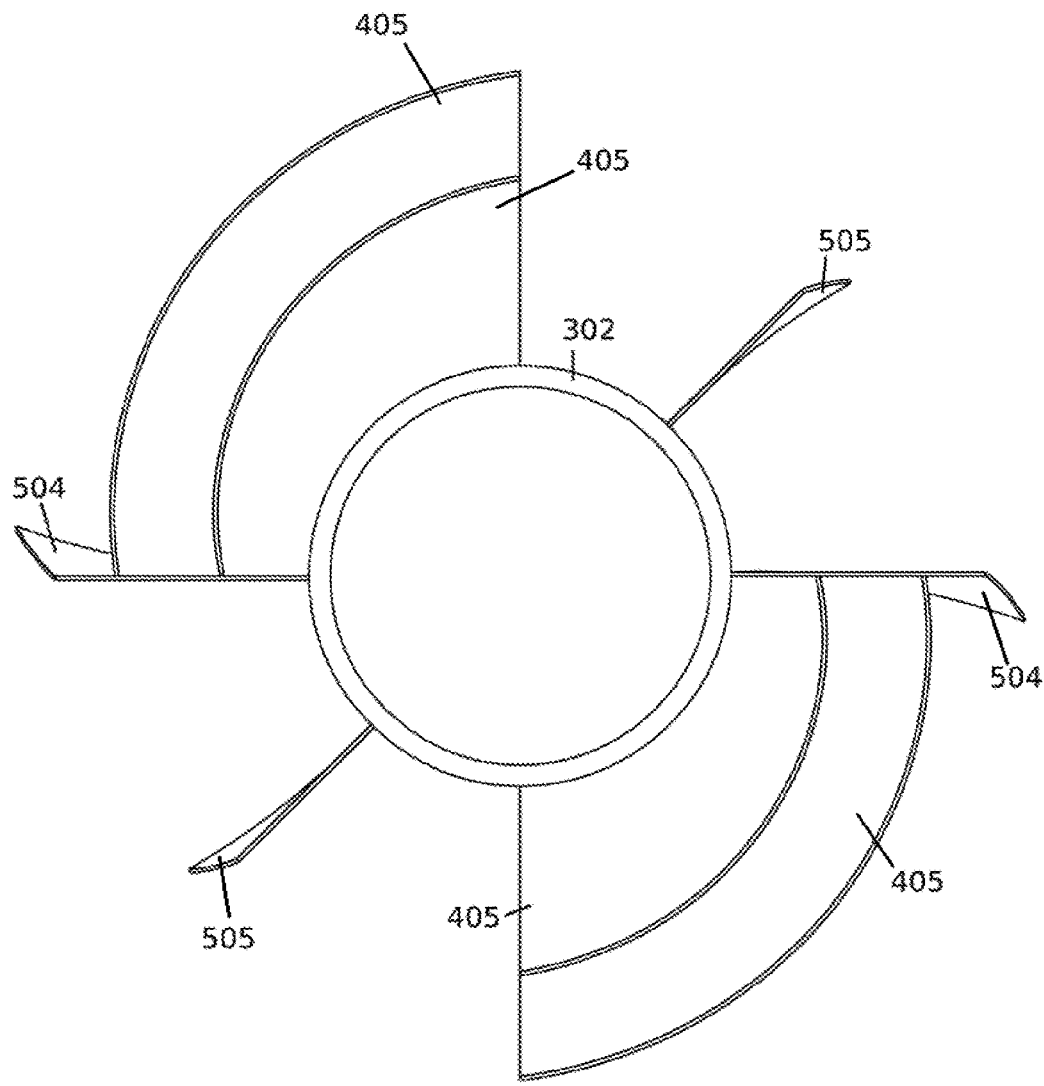
FIG. 27 is a right view of the conical screw of FIG. 24.
Figure 28:
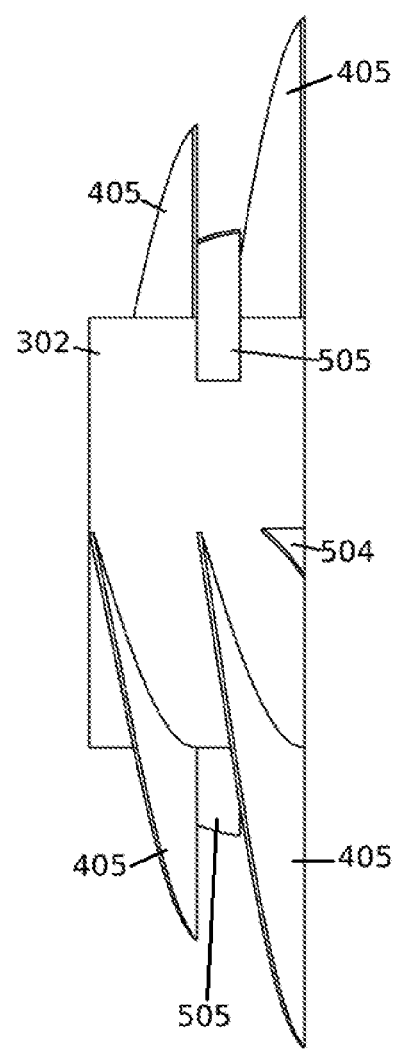
FIG. 28 is a back view of the conical screw of FIG. 24.

FIG. 24 is an isometric view of a conical screw according to an embodiment, having a cylindrical hub 302, four conveyor blades 405, and four detached blade inducers 504, 505. In this embodiment, the conveyor blades 405 each make a quarter turn pitch about the axis of rotation of the conical screw and have a height that travels only half the distance of the cylindrical hub 302. The blades each have varying widths to provide a conical angle of the conical screw. In this embodiment, the two detached blade inducers 504 are located at the end of the hub 302 and another two detached blade inducers 505 are located at the middle of the hub 302. All four detached blade inducers 504, 505 have varying lengths that correspond to the conical angle of the conveyor blades.

While embodiments of a conical screw are described herein, variations are contemplated. A conical screw design within the compression system of a gas turbine engine can contain any one or more of the different design elements and parameters or combinations of them thereof as well as other design features not mentioned such as, but not limited to, edge chamfers and fillets, for examples.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A non-axial compression system for a gas turbine engine for positioning upstream of a combustor of the gas turbine engine, the non-axial compression system comprising:
   a longitudinal axis;
   a first radial impeller having a first body for rotating about the longitudinal axis;
   a second radial impeller positioned on the longitudinal axis downstream of the first radial impeller and upstream of the combustor, the second radial impeller having a second body for rotating about the longitudinal axis; and
   a conical screw positioned on the longitudinal axis between the first radial impeller and the second radial impeller, the conical screw for rotating about the longitudinal axis, the conical screw having:
      a first radius adjacent to the first radial impeller and a second radius adjacent to the second radial impeller, the second radius smaller than the first radius;
      a hub; and
      at least one conveyor blade extending outwardly from the hub and positioned between the first radius and the second radius, the first body adjacent to the first radius and the at least one conveyor blade being spaced apart from one another along the longitudinal axis;
   wherein a fluid downstream of the first radial impeller is directed axially by the conical screw towards the second radial impeller.

2. The non-axial compression system of claim 1 further comprising the conical screw having at least one inducer blade positioned on the hub adjacent to the first radius.

3. The non-axial compression system of claim 2, wherein the at least one inducer blade is detached from the at least one conveyor blade.

4. The non-axial compression system of claim 3 further comprising a diffuser positioned on the longitudinal axis between the first body and the at least one conveyor blade.

5. The non-axial compression system of claim 2, wherein the at least one inducer blade is attached to the at least one conveyor blade.

6. The non-axial compression system of claim 5 further comprising a diffuser positioned on the longitudinal axis between the first body and the at least one conveyor blade.

7. The non-axial compression system of claim 2 further comprising a diffuser positioned on the longitudinal axis between the first body and the at least one conveyor blade.

8. The non-axial compression system of claim 1, wherein the hub is of a conical shape.

9. The non-axial compression system of claim 1, wherein the hub is of a cylindrical shape.

10. The non-axial compression system of claim 1, wherein the fluid when upstream of the conical screw has a first fluid flow profile that is different from a second fluid flow profile of the fluid when the fluid is between the first radius and the second radius.

11. The non-axial compression system of claim 10, wherein the second fluid flow profile has a greater axial fluid flow component than the first fluid flow profile.

12. The non-axial compression system of claim 1, wherein the first radial impeller, the second radial impeller and the conical screw are positioned on the longitudinal axis, the longitudinal axis being a spool of the gas turbine engine, the longitudinal axis extending between the first radial impeller and the second radial impeller.

13. The non-axial compression system of claim 1, wherein the conical screw rotates about the longitudinal axis as a spool of the gas turbine engine in order for the at least one conveyor blade to direct the fluid between the first radial impeller and the second radial impeller.

14. The non-axial compression system of claim 1 further comprising a diffuser positioned on the longitudinal axis between the first body and the at least one conveyor blade.

* * * * *